(12) United States Patent
Coen et al.

(10) Patent No.: US 6,550,609 B2
(45) Date of Patent: Apr. 22, 2003

(54) SUPPORTING ROLLER

(75) Inventors: Daniele Coen, Reggio Emilia (IT);
Piero Mondello, Buguggiate-Varese (IT)

(73) Assignee: Rexnord Marbett S.p.A., Correggio-Reggio Emilia (IT)

(*) Notice: Subject to any disclaimer, the term of this patent is extended or adjusted under 35 U.S.C. 154(b) by 0 days.

(21) Appl. No.: 09/858,177

(22) Filed: May 15, 2001

(65) Prior Publication Data

US 2002/0008006 A1 Jan. 24, 2002

(30) Foreign Application Priority Data

May 16, 2000 (EP) ............................. 00830352

(51) Int. Cl.⁷ .............................................. B65G 39/10
(52) U.S. Cl. ......................................... 198/842; 193/37
(58) Field of Search ............................. 193/37; 198/835, 198/842, 837

(56) References Cited

U.S. PATENT DOCUMENTS

| | | | | |
|---|---|---|---|---|
| 3,952,861 A | * | 4/1976 | Holmqvist et al. ..... 198/842 X |
| 4,664,252 A | * | 5/1987 | Galbraith ................. 193/37 X |
| 4,681,215 A | * | 7/1987 | Martin ...................... 193/37 X |
| 4,969,548 A | * | 11/1990 | Kornylak ............... 193/374 X |
| 5,361,884 A | * | 11/1994 | Yonezawa ................. 193/37 X |
| 5,744,238 A | | 4/1998 | Limperis et al. | |

FOREIGN PATENT DOCUMENTS

| EP | 0 960 841 A1 | 5/1999 |
|---|---|---|
| IT | 002692 | 4/1997 |

* cited by examiner

Primary Examiner—James R. Bidwell
(74) Attorney, Agent, or Firm—Quarles & Brady LLP

(57) ABSTRACT

A supporting roller (12, 122, 123) that has a greater than usual capacity for constant operation comprises a skirt (14), for supporting a return side (16) of an endless chain of a chain conveyor, and, coaxial with the skirt (14), a hub (18) designed to rotate idly on a journal (19), and, in addition, a sleeve (20) made of a material having high friction laid over the skirt (14), in particular overmolded around the skirt (14) or slid axially onto the skirt (14).

27 Claims, 6 Drawing Sheets

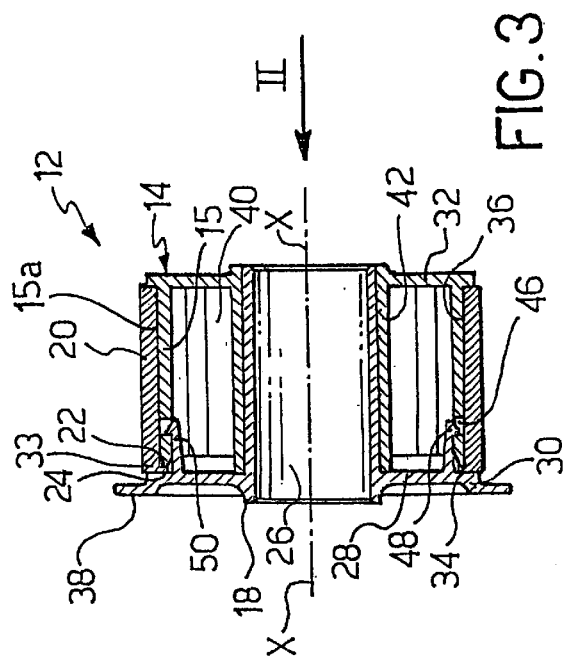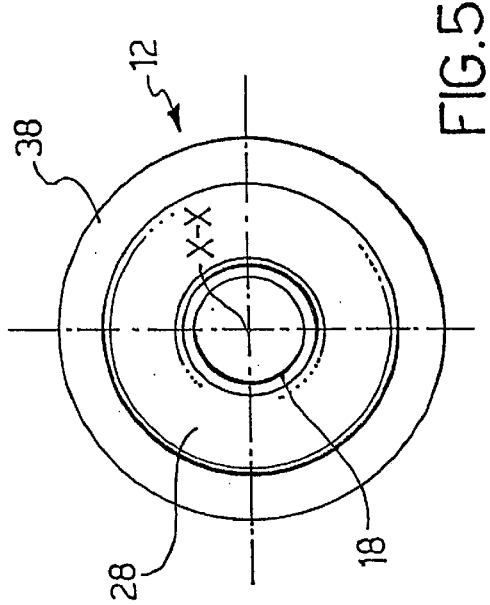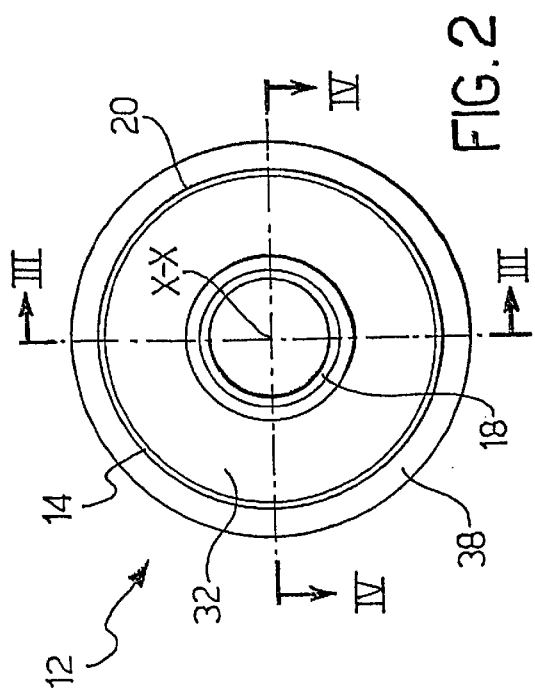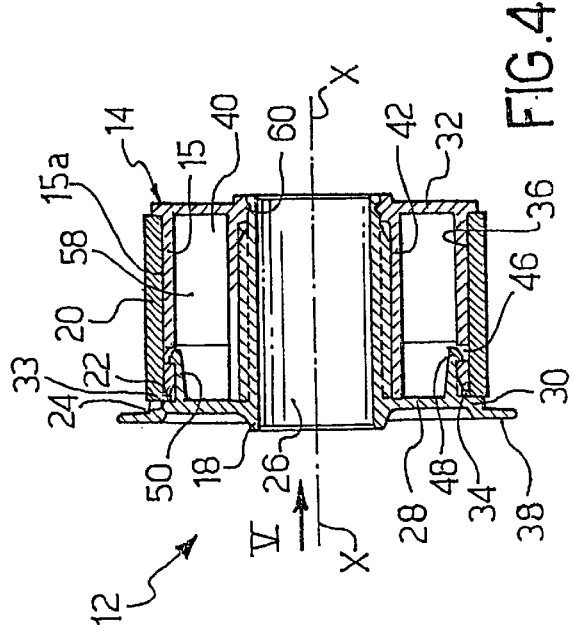

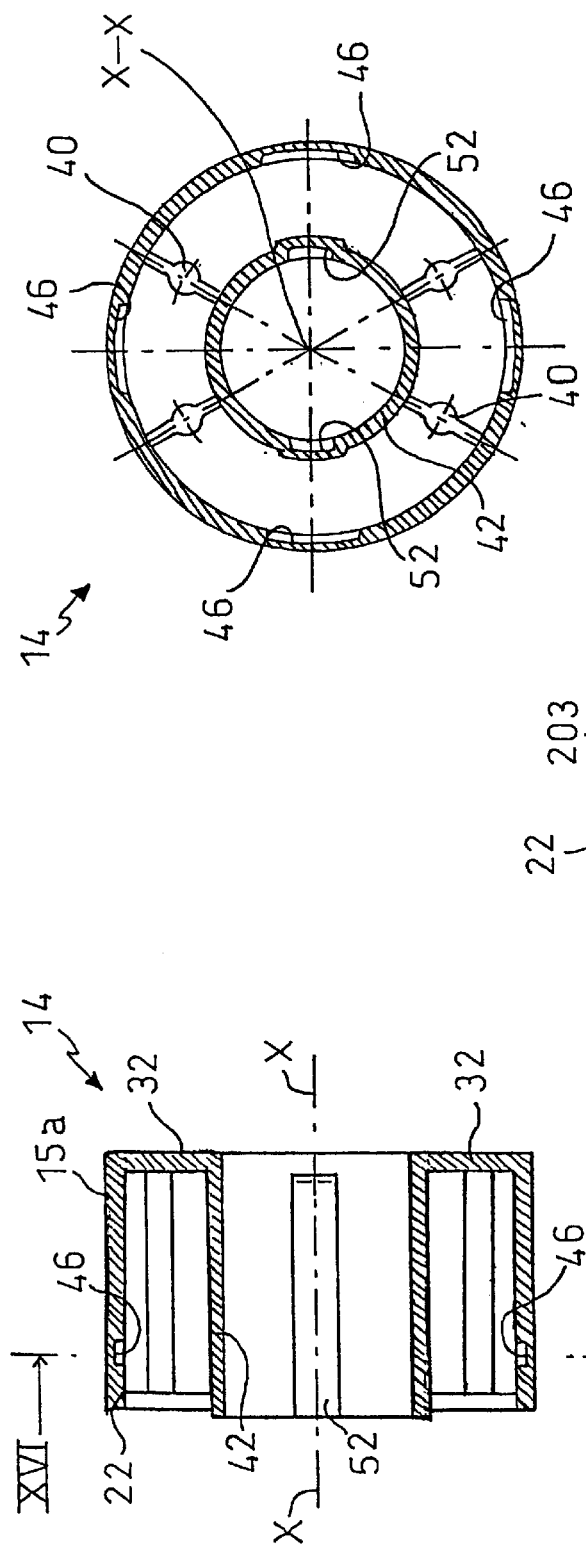
FIG.15
FIG.16
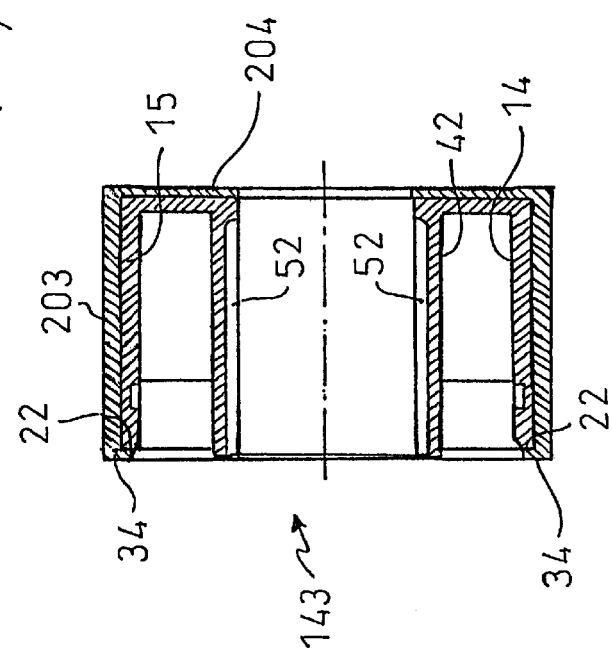
FIG.17

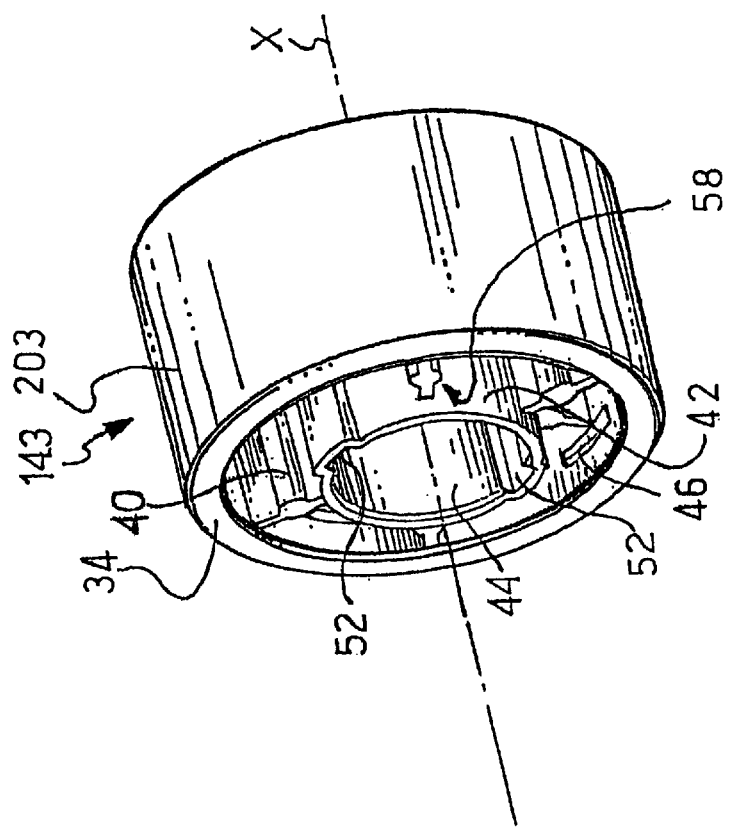
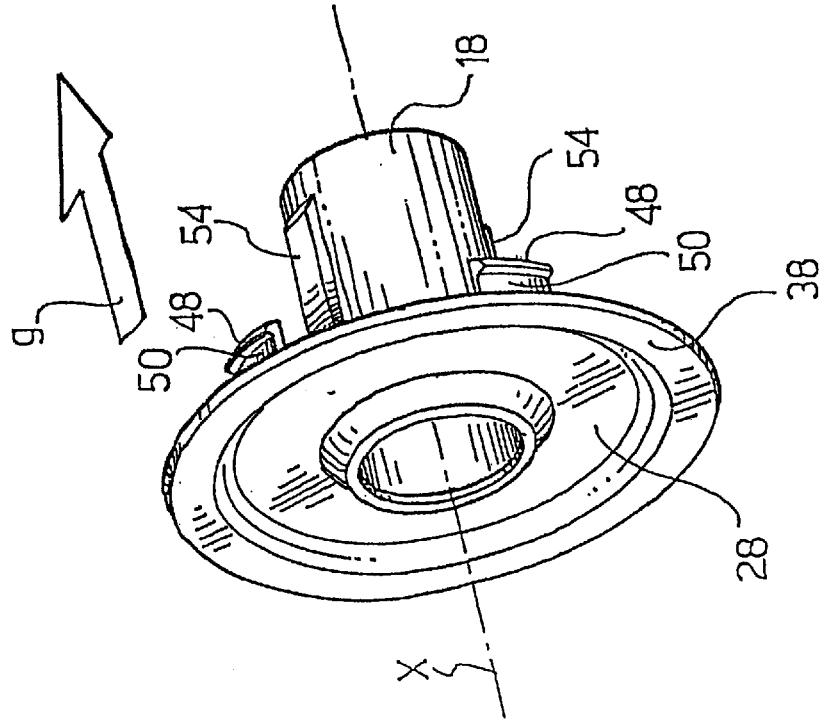
FIG.18

SUPPORTING ROLLER

CROSS-REFERENCE TO RELATED APPLICATIONS

This applications claims priority to European patent application No. 00830352.1 filed May 16, 2000.

FIELD OF THE INVENTION

The subject of the present invention is a supporting roller.

BACKGROUND OF THE INVENTION

One known type of supporting roller comprises a skirt, for supporting a return side of a chain of a conveyor, and, coaxial with the skirt, a hub designed to rotate idly on a journal.

Though in many ways satisfactory, known rollers leave much to be desired when it comes to durability of operation.

One of the main problems with known rollers is that they tend, as they rotate about their respective journals, to pick up impurities, such as particles resulting from wear, and dirt in general, which greatly increase the resistance to rotation of the supporting roller on the journal. Because of the increasing resistance to rotation present between the known roller and the journal, the return side of the chain tends to skid on the surface of the skirt, resulting in accelerated wear of the parts in contact with each other.

Another problem with known rollers, especially under the conditions of use at high speeds of rotation of the chain, is the noise of the coupling between the skirt and the chain.

The problem addressed by the present invention is to devise a supporting roller with structural and functional characteristics such as to overcome the abovementioned problems cited with reference to the prior art.

SUMMARY OF THE INVENTION

This problem is solved with a supporting roller of the type specified above, characterized in that a sleeve made of a material having high friction is laid over the skirt.

Specifically, the invention is a supporting roller of the type comprising a skirt, for supporting a return side of an endless chain of a chain conveyor, and, coaxial with the skirt, a hub designed to rotate idly on a journal, wherein it comprises a sleeve made of a material having high friction laid over the skirt.

The invention also provides a support for a return side of an endless conveyor chain, comprising at least two supporting rollers rotating idly side by side on a journal, wherein each roller includes a hub mounted on the journal and supporting a skirt on which is disposed a friction sleeve.

BRIEF DESCRIPTION OF THE DRAWINGS

Further features and the advantages of the supporting roller according to the present invention will appear from the description given below of a preferred embodiment thereof, provided by way of non-restrictive indication, with reference to the accompanying figures in which:

FIG. 2 is a side view of the supporting roller shown in FIG. 1;

FIG. 3 is an axial section through the roller shown in FIG. 2, taken on III—III;

FIG. 4 is an axial section through the roller shown in FIG. 2, taken on IV—IV;

FIG. 5 is a side view of the roller shown in FIG. 4, in the direction of the arrow V;

FIG. 15 is an axial section similar to that of FIG. 12 showing a component of the supporting roller of FIGS. 11–14, in an intermediate stage of the production process;

FIG. 16 is a section through the component of FIG. 15, taken on XVI—XVI;

FIG. 17 is an axial section taken on XVII—XVII through the component shown in FIG. 15, at a later stage in the production process; and FIG. 18 is a perspective view, with separated parts, of a stage in the assembly of the roller of FIGS. 11–17.

DETAILED DESCRIPTION OF THE PREFERRED EMBODIMENTS

Figure 8:
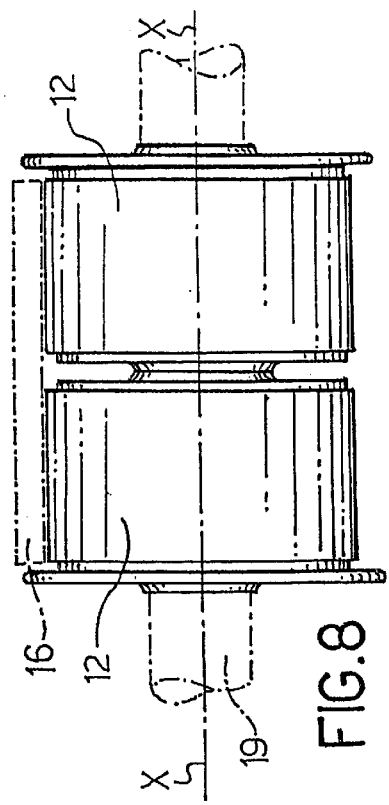
FIGS. 8, 9 and 10 are side views of three embodiments of supporting means comprising two supporting rollers.

Referring to the accompanying figures, the number 12 is a general reference for a supporting roller of axis X—X that comprises a skirt 14 designed to offer support to a return side 16 of an endless chain of a chain conveyor (shown in the figures in chain lines), and a hub 18, coaxial with the skirt 14 and designed to be slid axially onto a journal 19. The term "skirt" here denotes a supporting structure comprising an intermediate bush 15 with a cylindrical outer surface 15a capable of supporting the chain 16 as it advances.

Advantageously, a sleeve 20 made of material with high friction, meaning a sleeve made of a material with a high coefficient of friction, is laid over the skirt 14. It is particularly advantageous for the sleeve 20 to be slid axially onto the cylindrical outer surface 15a of the skirt 14. The said sleeve 20 covers all the cylindrical outer surface 15a and so comes between the chain 16 and the intermediate bush 15.

The sleeve 20 with high friction is preferably composed of a material selected from the natural or synthetic elastomers and in particular is of rubber.

Also advantageously, the sleeve 20 is held tightly between two opposing shoulders 22, 24 and preferably between a first shoulder 22 and a second shoulder 24 provided on the skirt 14 and on the hub 18 respectively, as will be detailed hereinbelow. Near one end 26 of the hub 18 is an annular wall 28. This wall 28 has a radial relief 30 or shoulder forming the said second shoulder 24 by which the sleeve 20 is held. Integral with the cylindrical bush 15 of the skirt 14 is an end wall 32 situated at the opposite end from the annular wall 28 of the hub 18. This wall 32 is annular, so that the roller 12 can be slid axially onto the journal 19. The surface of the free end of the bush 15 is the first shoulder 22 by which the sleeve 20 is held. At the end 33 of the sleeve 20 nearest and facing the annular wall 28 is an inward annular projection 34 on which the said opposing shoulders 22, 24 are to act. The width of the annular projection 34 is greater than the minimum distance achievable between the shoulders 22 and 24 after their closure.

Figure 1:
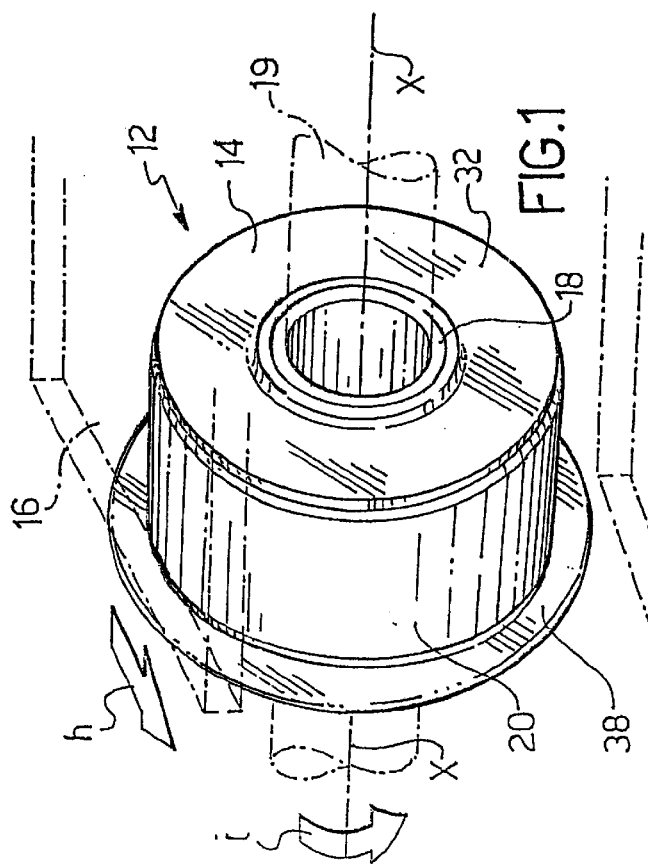
FIG. 1 is a perspective view of a supporting roller.

The main advantages of the invention lie in the fact that the side 16 of the chain rolling (arrow h) over the sleeve 20 of material with a high coefficient of friction exerts a large tangential action (arrow i) on the supporting roller 12 but overcomes the resistance caused by the impurities that collect between the roller 12 and the journal 19, thus ensuring precise skid-free rolling and without accelerated wear of the components in contact with each other (FIG. 1).

It is also an advantage that the sleeve 20 is held between opposing shoulders 22, 24, thus ensuring that the sleeve 20 is clamped and anchored firmly to the skirt 14 and to the hub 18 so that it will withstand the stresses produced by the section 16 of chain in motion. Moreover, this tight holding of the sleeve 20 creates a perfect seal, preventing impurities from getting inside the roller 12. By virtue of this embodiment of the invention, the tight closure occurs against the annular projection 34, which has small longitudinal dimensions compared with the overall dimensions of the sleeve 20, which fact makes it possible to have highly precise coupling even with not very high processing tolerances, as in the case of large-scale production.

Another advantage is that, owing to the presence on the skirt 14 of the sleeve 203 of elastomeric material, the coupling between the chain and the roller is noiseless, even at the high speeds of rotation of the chain.

In order to prevent a sideways action relative to the supporting roller 12 from pushing the sleeve 20 off, it is advantageous if the annular wall 28 of the hub 18 and the end wall 32 of the skirt 14 extend partially against the sides of the sleeve 20 so that the sleeve is partially embraced by a containment seat 36.

To prevent sideways movements of the chain 16 as it rolls over the roller, it is advantageous too if a retaining flange 38 extends radially from one end of the supporting roller 12. For example, the flange 38 is formed as a radial extension of the annular wall 28 of the hub 18.

In order that the sleeve 20 can be slid axially onto the skirt 14 and the annular projection 34 be held tightly, the hub 18 advantageously fits telescopically into the skirt 14. More specifically, a plurality of spokes 40 extend inwards from the bush 15 and join a tube 42 positioned coaxially with the skirt 14 and forming a seat 44 for the hub 18 (FIG. 6).

If using a supporting roller 12 comprising a hub 18 that fits the skirt 14 telescopically, it is advantageous to produce the hub 18 in acetal resin and the skirt 14 in polypropylene, in order to ensure good mechanical strength and at the same time reduce costs.

Advantageously, the hub 18 and the skirt 14 are connected by snap-connection means. The sleeve 20, held between the skirt 14 and the hub 18, which are connected by the snap-connection means, is preloaded. For example, the skirt 14 has at least one seat 46 for receiving at least one tooth 48 projecting from the hub 18. The seats 46 are preferably slots formed transversally in the bush 15, into which teeth 48 formed on the ends of elastic brackets 50 extending longitudinally from the annular wall 28 of the hub 18, engage with a snap action from the inside of the bush 15.

Figure 6:
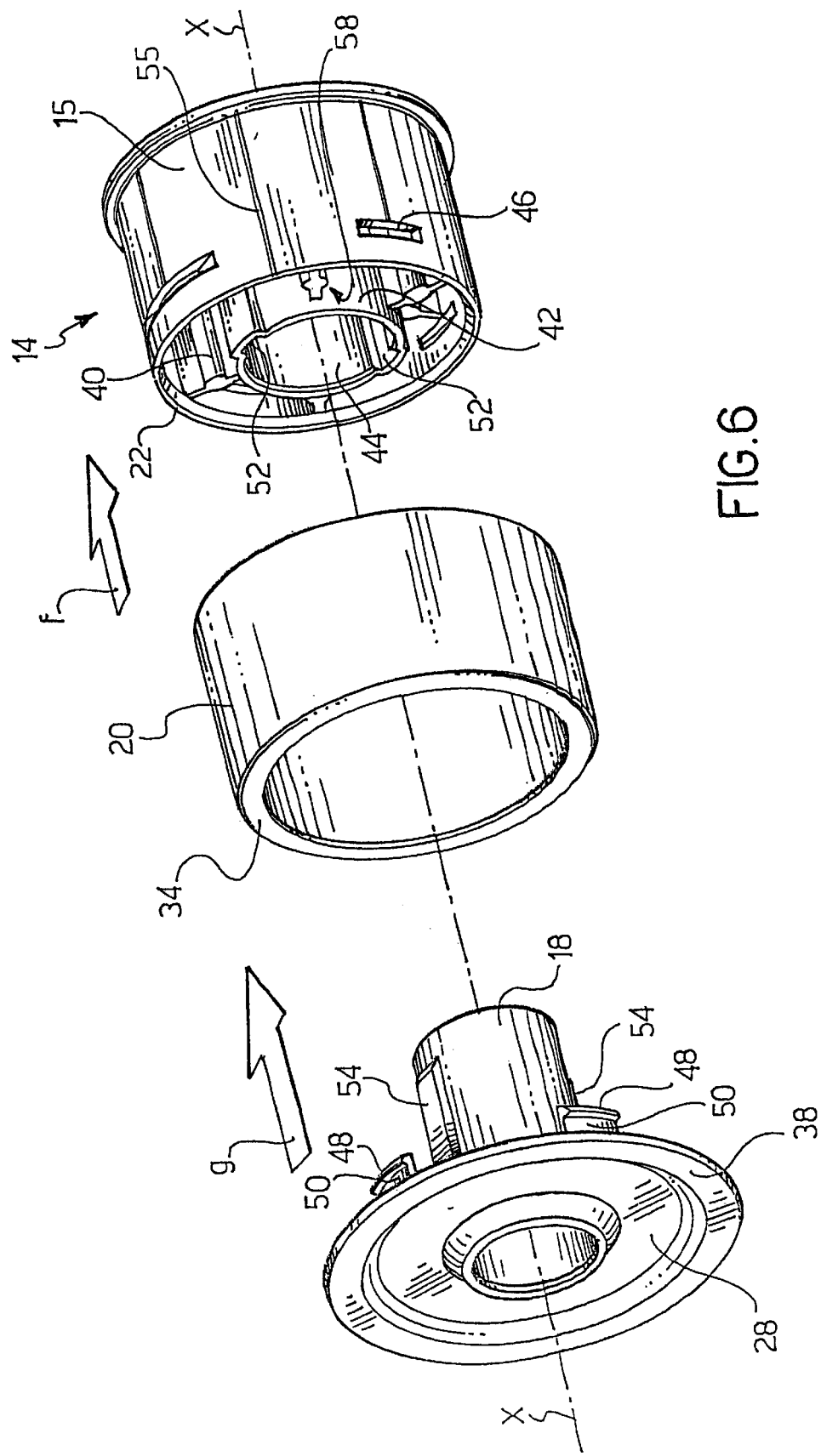
FIG. 6 is a perspective view, with separated parts, of a stage in the assembly of the roller of FIG. 1.
Figure 11:
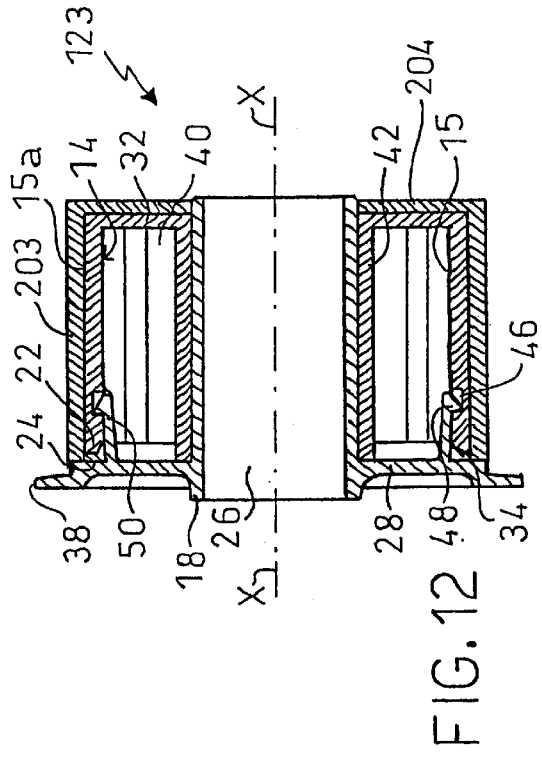
FIG. 11 is a side view of a supporting roller in a third embodiment.
Figure 12:
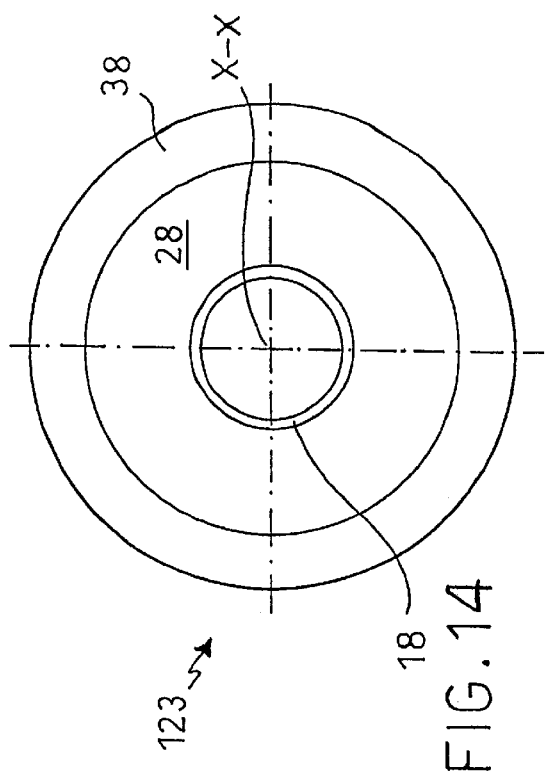
FIG. 12 is an axial section through the roller shown in FIG. 11, taken on XII—XII.
Figure 13:
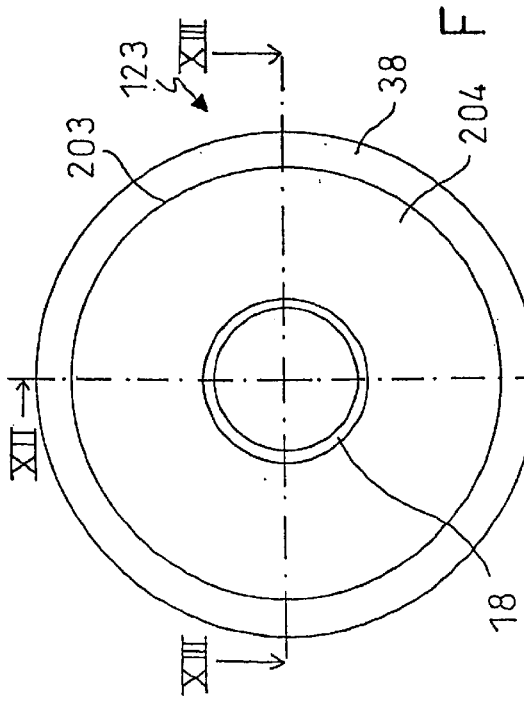
FIG. 13 is an axial section through the roller shown in FIG. 11, taken on XIII—XIII.
Figure 14:
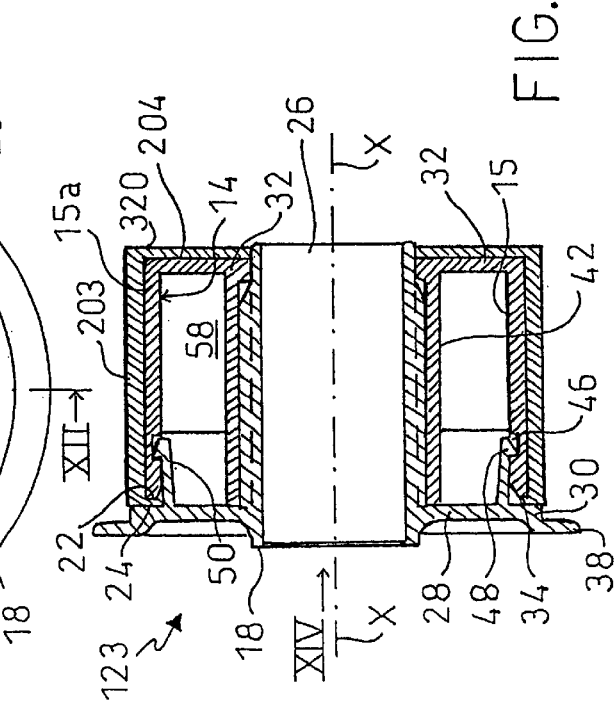
FIG. 14 is a side view of the roller shown in FIG. 13, in the direction of arrow XIV.

For correct angular location of the hub 18 with respect to the skirt 14, the tube 42 contains at least one longitudinal slot 52 for receiving a relief 54 on the outside of the hub 18 (FIG. 6). The relief 54 of the hub 18 and the slot 52 of the tube 42 are arranged so as to align the teeth 48 projecting from the hub 18 with the slots 46 formed in the skirt 14, for a correct engagement.

The sleeve 20 is advantageously slid axially onto the skirt 14 to provide an interference fit, which facilitates the transfer of the tangential action produced by the rolling of the chain from the sleeve 20 to the skirt 14 and thence to the hub 18. To still further advantage, the sleeve 20 is fixed integrally to the skirt 14 by the provision of a plurality of longitudinal projections 55 formed on the outside of the skirt (FIG. 6).

In order to prevent impurities from penetrating between the hub 18 and the tube 42 and filling the space 58 defined by the tube 42, end wall 32 and intermediate bush 15, as well as by the annular wall 28 of the hub 18, a relief 60 is provided in the tube 42 at the opposite end from the said annular wall 28 and engages in the outer wall of the hub 18 (FIG. 4). The proposed supporting roller 12 is therefore more hygienic and does not require repeated and frequent dismantling for cleaning purposes.

Figure 7:
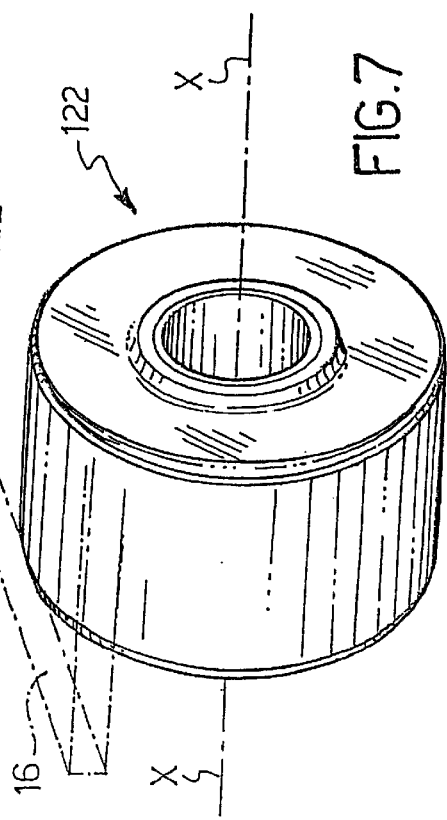
FIG. 7 is a perspective view of a supporting roller in a second embodiment.

As can be seen in FIG. 7, it is possible and advantageous to provide a supporting roller 122 according to the invention without the chain 16-retaining flange 38. This means that it is possible to provide supporting means for the return side of an endless chain of a conveyor, the said means comprising at least two flanged 38 rollers 12 arranged symmetrically and rotating idly on the journal 19 (FIG. 8). Alternatively, the said means may comprise at least one supporting roller 122 with no flange (FIG. 9), or the supporting means may comprise a supporting roller 12 with a retaining flange 38 and a roller 122 without this flange (FIG. 10).

The operation of the supporting roller will now be described with the assistance of FIGS. 1 and 6.

The hub 18 is fitted into the inside of the tube 42, and tightly closes (in the direction of arrow g in FIG. 6) the sleeve 20 which has already been slid axially (in the direction of arrow f) onto the sleeve 14. Because of the sleeve 20, which is made of a material with high friction, the supporting roller 12 is stressed, under the weight of a section of the chain 16 in motion (arrow h) with a tangential action sufficient to overcome the rolling resistance due to impurities accumulated on the journal.

FIGS. 11 to 18 illustrate a further embodiment of a supporting roller 123 in accordance with the present invention. In these figures, parts identical or similar to those previously described will be identified by the same numerical references.

The peculiarity of the roller 123 in this further embodiment of the invention lies first of all in the fact that it is provided with a sleeve 203 which is not simply slid axially onto the skirt 14 but overmoulded directly around it, by injection of material in liquid phase into a mould containing the skirt 14, around the cylindrical outer surface 15a of the skirt 14.

The slots 46, provided in the skirt 14 to accommodate the teeth 48 projecting from the hub 18 to bring about the snap connection between the skirt 14 and the hub 18, extend into the thickness of the bush 15 but not all the way through the thickness of this bush 15, in other words the slots 46 do not break through onto the cylindrical outer surface 15a: the cylindrical outer surface 15a of the bush 15 therefore has no openings and is essentially continuous.

The end wall 32 of the skirt 14 preferably does not extend radially beyond the cylindrical outer surface 15a of the skirt 14, and stops more or less flush with the said surface 15a. In other words, the containment seat 36 for the sleeve 203 is not formed. Also, the sleeve 203 not only extends over the cylindrical outer surface 15a of the skirt but also continues past a circular edge 320 between the bush 15 and the end wall 32 to form a discoidal covering 204 which clings to and covers the outside of the end wall 32 of the skirt 14. The discoidal covering 204 extends as far as the edge of the central opening of the tube 42. In this way the face 204 acts as a seal against the hub 18, preventing dirt from working in between the hub and tube 42.

In order to produce the sleeve 203, the skirt 14 (FIGS. 15 and 16) is first made and then inserted into a mould, and the elastomeric material which will form the sleeve 203 is injected into this mould in the liquid phase in such a way as to overmould the sleeve 203 and the face 204 directly onto the skirt 14. A substantially single component 143, shown in FIG. 17, is thus obtained in which the sleeve 203 is firmly fixed to the skirt 14. The hub 18 can then be coupled to the component 143 in the same way as described earlier with reference to the first two embodiments. The sleeve 203 is thus again held tightly between the opposing shoulders 22, 24.

Given the right apparatus, the skirt 14 and the sleeve 203 can also be made by co-injecting the two different materials into a suitable mould.

Examples of suitable materials from which to make the roller 123 are polypropylene for the skirt 14 and thermoplastic rubber EPDM for the sleeve 203; alternatively the skirt 14 can be made in ABS, and the sleeve 203 in thermoplastic polyurethane rubber. Other materials can of course be used, as will be obvious to those skilled in the art.

Producing the sleeve 203 by overmoulding it directly onto the skirt 14 not only simplifies the operations of assembly of the roller, which is now therefore composed of two components (the hub and the combined skirt and sleeve) instead of three as in the earlier embodiments, but also offers a better guarantee, compared to the simple interference fit, that the tangential action produced by the rolling of the chain will be transmitted to the skirt 14 and so to the hub 18.

Figure 9:
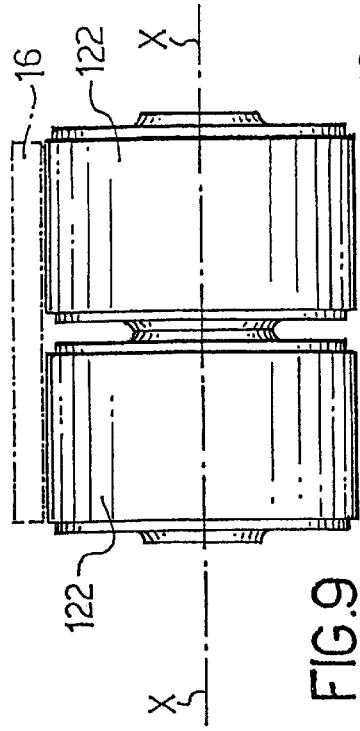
Figure 10:
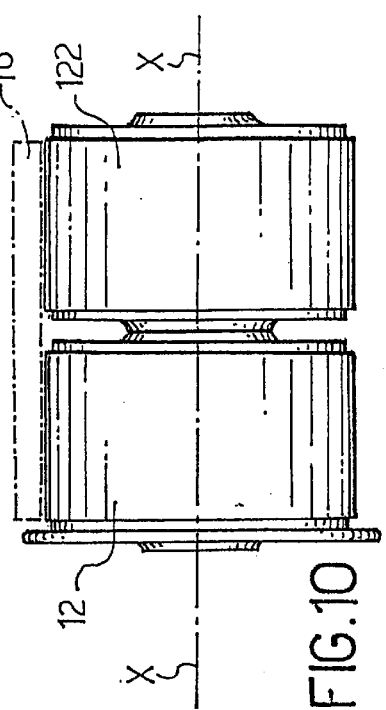

It should be observed that the roller 123 in accordance with this further embodiment can also be modified in such a way as to eliminate the flange 38, thus giving a structure similar to that of FIG. 7, and therefore making the variety of configurations shown in FIGS. 8, 9 and 10 possible.

A person skilled in the art could, of course, in order to satisfy particular and specific requirements, make numerous modifications and alterations to the supporting roller described above that would nonetheless all remain within the scope of protection of the invention as defined in the following claims.

What is claimed is:

1. A supporting roller of the type having a skirt, for supporting a return side of an endless chain of a chain conveyor and, coaxial with the skirt, a hub designed to rotate idly on a journal, wherein the roller comprises a sleeve made of a material having high friction laid over the skirt, said sleeve having an inward annular projection tightly clamped between first and second opposing shoulders of said hub and said skirt, respectively.

2. The supporting roller according to claim 1, wherein the sleeve is overmoulded around the skirt.

3. The supporting roller according to claim 1, wherein the sleeve is slid axially onto the skirt.

4. The supporting roller according to claim 3, wherein a plurality of projections are formed on the outside of the skirt to act on the inside of the sleeve.

5. The supporting roller according to claim 1, wherein the hub and the skirt are connected by a snap connection.

6. The supporting roller according to claim 1, wherein the hub includes a chain-retaining flange.

7. The supporting roller according to claim 1, wherein the roller has an annular wall near one end of the hub forming the second shoulder and said first shoulder is formed at one end of said skirt.

8. The supporting roller according to claim 2, wherein the sleeve is of an elastomer.

9. The supporting roller according to claim 3, wherein the sleeve is of an elastomer.

10. The supporting roller according to claim 1, wherein the hub fits telescopically into the skirt.

11. The supporting roller according to claim 10, wherein a plurality of spokes extend inwards from the skirt and join a tube positioned coaxially with the skirt and forming a seat for the hub.

12. The supporting roller according to claim 11, wherein an end wall of the skirt extends from the latter towards the tube.

13. The supporting roller according to claim 2, wherein the sleeve is rubber.

14. The supporting roller according to claim 13, wherein the sleeve is a thermoplastic rubber.

15. The supporting roller according to claim 14, wherein the said thermoplastic rubber is selected from the group consisting of EPDM and polyurethane.

16. The supporting roller according to claim 3, wherein the sleeve is rubber.

17. The supporting roller according to claim 16, wherein the sleeve is a thermoplastic rubber.

18. The supporting roller according to claim 17, wherein the said thermoplastic rubber is selected from the group consisting of EPDM and polyurethane.

19. The supporting roller according to claim 1, wherein the hub is made of acetal resin.

20. The supporting roller according to claim 2, wherein the skirt is a made of a plastic selected from the group consisting of polypropylene and ABS.

21. The supporting roller according to claim 3, wherein the skirt is a made of a plastic selected from the group consisting of polypropylene and ABS.

22. The supporting roller according to claim 5, further including at least one longitudinal slot for receiving an angle-locating relief on the outside of the hub.

23. A supporting roller of the type having a skirt, for supporting a return side of an endless chain of a chain conveyor and, coaxial with the skirt, a hub designed to rotate idly on a journal, wherein the roller comprises a sleeve made of a material having high friction laid over the skirt;
    wherein the hub fits telescopically into the skirt;
    wherein a plurality of spokes extend inwards from the skirt and join a tube positioned coaxially with the skirt and forming a seat for the hub;
    wherein an end wall of the skirt extends from the latter towards the tube;
    wherein the sleeve is overmoulded around the skirt and extends over the end wall of the skirt so that it covers it externally.

24. A supporting roller of the type having a skirt, for supporting a return side of an endless chain of a chain conveyor and, coaxial with the skirt, a hub designed to rotate idly on a journal, wherein the roller comprises a sleeve made of a material having high friction laid over the skirt;
    wherein the hub and the skirt are connected by a snap connection;
    wherein there is at least one seat in the skirt for at least one tooth projecting from the hub to snap into to form the said snap connection.

25. The supporting roller according to claim 24, wherein there are one or more teeth at the end of at least one bracket extending longitudinally from an annular wall near one end of the hub.

26. A support for a return side of an endless conveyor chain, comprising at least two supporting rollers rotating idly side by side on a journal, wherein each roller includes a hub mounted on the journal and supporting a skirt on which is disposed a friction sleeve, said sleeve having an inward annular projection tightly clamped between first and second opposing shoulders of said hub and said skirt, respectively.

27. The support according to claim 26, wherein at least one of the supporting rollers has a chain-retaining flange.

* * * * *